United States Patent
Jokura

(10) Patent No.: US 7,979,634 B2
(45) Date of Patent: Jul. 12, 2011

(54) APPARATUS AND METHOD FOR PREVENTING DOUBLE ALLOCATION, AND MEDIUM FOR RECORDING ITS ALLOCATION PROGRAM

(75) Inventor: Akiko Jokura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 336 days.

(21) Appl. No.: 11/545,478

(22) Filed: Oct. 11, 2006

(65) Prior Publication Data
US 2007/0250680 A1 Oct. 25, 2007

(30) Foreign Application Priority Data
Apr. 24, 2006 (JP) .................................. 2006-119719

(51) Int. Cl.
G06F 12/00 (2006.01)
(52) U.S. Cl. .................. 711/114; 711/170; 711/E12.001
(58) Field of Classification Search .................. 711/114, 711/170
See application file for complete search history.

(56) References Cited

U.S. PATENT DOCUMENTS

| 6,405,284 B1 * | 6/2002 | Bridge ........................... 711/114 |
| 6,810,462 B2 | 10/2004 | Matsunami et al. |
| 2002/0165930 A1 * | 11/2002 | Theriault et al. ............... 709/214 |
| 2004/0260965 A1 * | 12/2004 | Kelman ........................... 714/2 |
| 2005/0172005 A1 * | 8/2005 | Goodwin ....................... 709/211 |
| 2005/0283583 A1 | 12/2005 | Asano et al. |
| 2007/0214338 A1 * | 9/2007 | Mizuno et al. ................. 711/170 |
| 2008/0209158 A1 | 8/2008 | Asano et al. |

FOREIGN PATENT DOCUMENTS

| JP | 2003-316713 | 11/2003 |
| JP | 2005-322102 | 11/2005 |

OTHER PUBLICATIONS

Isao Igarashi, "Storage Management Solution in the SAN Environment", *Fujitsu*, vol. 52, No. 2, pp. 118-122, Mar. 2001, Abstract Only.
Japanese Office Action for corresponding Japanese Application 2006- 119719; dated Mar. 22, 2011.

* cited by examiner

*Primary Examiner* — Reginald G Bragdon
*Assistant Examiner* — Larry T Mackall
(74) *Attorney, Agent, or Firm* — Staas & Halsey LLP

(57) ABSTRACT

An allocation apparatus of the present invention provides the mechanism that another logical volume of temporary number is automatically made in the storage system shared with plural servers, when it is recognized that the targeted logical volume is doubly allocated. By the present invention, the data destruction can be prevented by making the target server accessing another logical volume allocated automatically when the double allocation is detected. And the processing of a temporary allocation is continued until the alert message to the effect that the logical volume required from the target server is overlapped in the logical storage area is transmitted to the operator, the allocated another logical volume is approved by the operator, and the cancellation of overlapping allocation is confirmed.

8 Claims, 8 Drawing Sheets

FIG. 2

| SERVER NAME | ZONE NO. | WWN | ALLOCATED LOGICAL VOLUME | | | | ... |
|---|---|---|---|---|---|---|---|
| | | | 1 | 2 | 3 | 4 | |
| Server1 | Zone1 | WWN1 | LV#0 | LV#1 | LV#4 | LV#5 | |
| Server2 | Zone2 | WWN2 | LV#2 | LV#3 | LV#4 | LV#6 | |
| | | | ⋮ | | | | |

FIG. 3

| SERVER NAME | ZONE NO. | WWN | ALLOCATED LOGICAL VOLUME | | | | |
|---|---|---|---|---|---|---|---|
| | | | 1 | 2 | 3 | 4 | ... |
| Server1 | Zone1 | WWN1 | LV#0 | LV#1 | LV#4 | LV#5 | |
| Server2 | Zone2 | WWN2 | LV#2 | LV#3 | LV#A | LV#6 | |
| | | | ⋮ | | | | |

FIG. 4

| ZONE NO. | ALLOCATED LOGICAL VOLUME | | | | | | | |
|---|---|---|---|---|---|---|---|---|
| | 1 | TEMPORARY ALLOC. FLAG | 2 | TEMPORARY ALLOC. FLAG | 3 | TEMPORARY ALLOC. FLAG | 4 | TEMPORARY ALLOC. FLAG |
| Zone1 | LV#0 | INVALID | LV#1 | INVALID | LV#4 | INVALID | LV#5 | INVALID |
| Zone2 | LV#2 | INVALID | LV#3 | INVALID | LV#A | VALID | LV#6 | INVALID |
| | | | | ⋮ | | | | |

FIG. 5

| LOGICAL VOLUME NO. | MESSAGE FLAG |
|---|---|
| LV#0 | INVALID |
| LV#1 | INVALID |
| LV#2 | INVALID |
| LV#3 | INVALID |
| LV#4 | INVALID |
| LV#5 | INVALID |
| LV#A | VALID |
| LV#6 | INVALID |

APPARATUS AND METHOD FOR PREVENTING DOUBLE ALLOCATION, AND MEDIUM FOR RECORDING ITS ALLOCATION PROGRAM

BACKGROUND OF THE INVENTION (1) Field of the Invention

The present invention relates to technology for preventing a logical volume being doubly allocated in a storage device, when accessing it from the server in the storage system that plural servers share.

(2) Description of the Related Art

Recently, the SAN (Storage Area Network) system by which plural hosts share one or plural storage devices via a network is actively used instead of making the host computer such as server connect directly the storage device.

In the SAN environment where at least one or more storage systems are shared with plural servers, to prevent data destruction by a wrong access and an unjustified access, a variety of access limitation method is proposed (for example, I. Igarashi, "Storage Management Solution in the SAN Environment", FUJITSU, Vol. 52, No. 2, p 118-122, 2001).

In a conventional method for preventing double allocation, an operator is previously setting an accessible logical volume from the server. In that case, it is necessary to secure a logical volume of the storage device for the server to access the shared storage device when the data stored in the storage device was changed in the transaction processing system, and so as not to cause the data destruction etc.

The setting of the logical volume is performed by the operator. The operator sets the zone as logical storage areas in a physical storage device and allocates the logical volume to relate ID of the server (identifier) with the zone. Accordingly, only the server which the operator correctly set can access to the logical volume.

However, the above-mentioned setting work for allocating the zone to the logical volume is very complex for the operator, and there are a lot of cases that the operator mistakes the set up of the logical volume.

Therefore, in the present invention, to solve the above-mentioned problem, the system checks whether the same one logical volume is registered over plural logical storage areas (it is called the zone) or not, generates another temporary logical volume when there was a double allocation as a result, and allocates it to the target zone.

SUMMARY OF THE INVENTION

An object of the present invention is to provide a method and apparatus for automatically allocating a logical volume when an overlapped registration of the logical volume was detected and preventing its data destruction.

One aspect of the features of the present invention is as followings.

First, an allocation apparatus for preventing a logical volume from being doubly allocated in a storage device shared with plural servers, comprising: receiving a set up information of a logical volume which was inputted by an operator at a management terminal to set up in a logical storage area of said storage device and registering it to a management table; checking whether there is a double allocation of said logical volume or not, referring to said management table which manages the operation of said logical volume; and allocating temporarily an another logical volume different from said logical volume when it was detected that said logical volume is doubly allocated in the same logical storage area.

That is, even if an operator inputs accidentally the same logical volume for a certain server as it is under operation for other server, the apparatus of the present invention may perform processing which detects it automatically and assigns another logical volume temporarily. Accordingly, when the concurrent access from two or more servers occurs, the accrual of obstacles such as data destruction is avoidable.

Secondly, the apparatus of the present invention is having the management table on which the setting information was registered consisting of a server name, the zone number which is concerned with the position of the logical storage area in a storage apparatus, and the assigned logical volume number.

That is, according to the second invention, since a server name and an allocation logical volume number are associated and it is managed with respect to every zone number secured as a logical storage area in the common storage, it will make easy collation of the logical volume and temporary allocation of another logical volume, and management which does not cause a trouble to access from two or more servers will be realized.

Thirdly, the apparatus of the present invention is having the means which sends the message advices of having assigned another logical volume temporarily to the terminal for system manager, when a setup of a logical volume is double.

That is, the apparatus of the third invention provides the structure made to access another logical volume concerned until double allocation of a logical volume is canceled by the operator who manages a system.

BRIEF DESCRIPTION OF THE DRAWINGS

FIG. 2 shows a data structure of a table for setting a zone for a logical volume (in the case of a double allocation).

FIG. 3 shows a data structure of a table for setting a zone for a logical volume (in the case of a temporary allocation).

FIG. 4 shows a data structure of a table for setting a zone for a logical volume (in the case of a flag setting for a temporary allocation).

FIG. 5 shows a flag setting table for sending a message of double allocation to the operator's terminal).

DETAILED DESCRIPTION OF THE INVENTION

Hereafter, based on drawings, embodiments of the present invention are explained.

Figure 1:
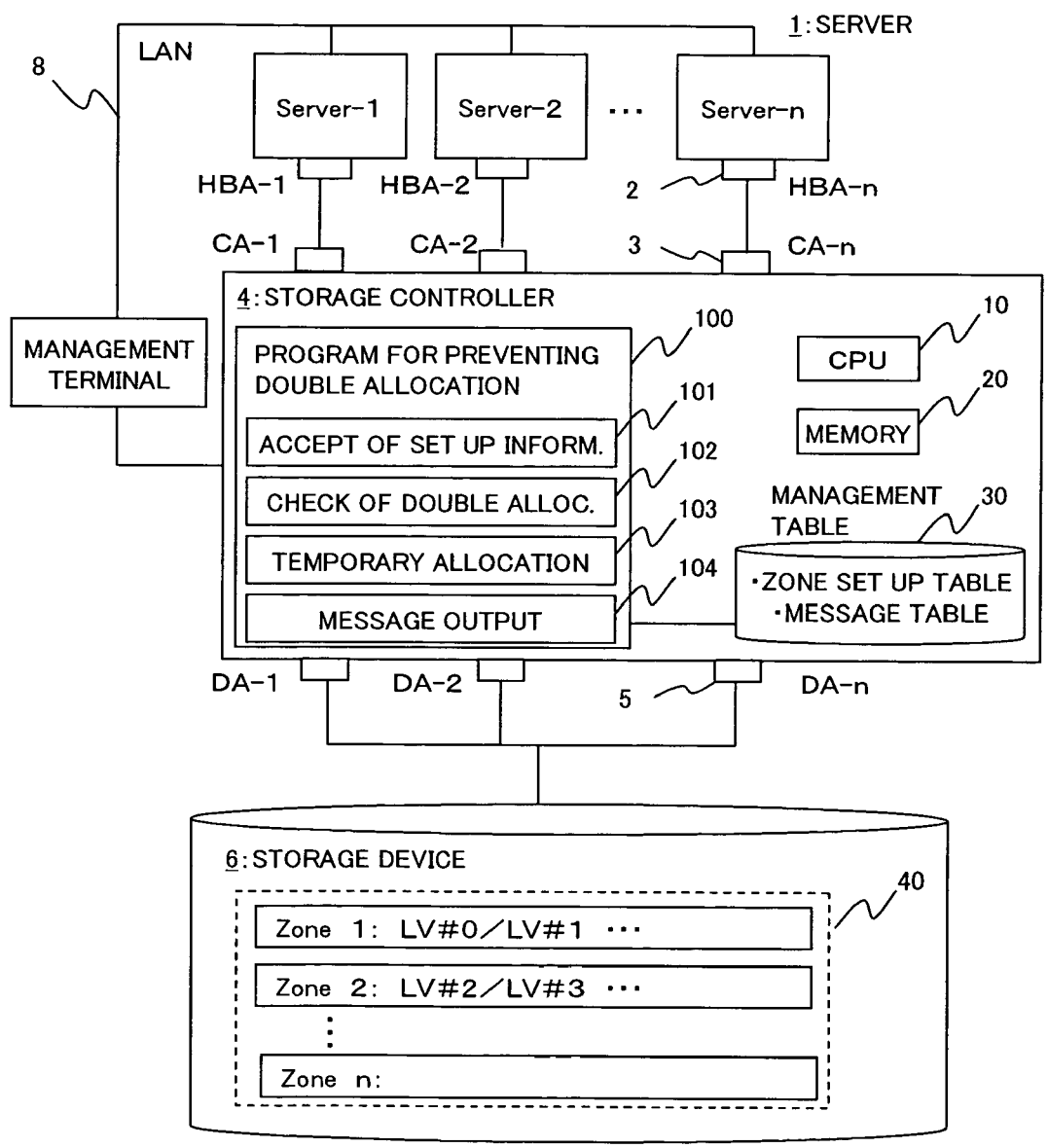
FIG. 1 shows a basic configuration of a system for preventing a double allocation of a logical volume.

FIG. 1 shows a basic configuration of system for preventing double allocation of a logical volume according to the embodiment of the present invention.

The double allocation prevention system is composed of server 1 (plural servers: Server-1, Server-2 . . . Server-n), a storage controller 4 which has HBA 2 (Host Bus Adaptor) for the interface connected with servers, CA 3 (Channel Adaptor) for controlling the connection with the servers, and DA 5 (Device Adaptor) for controlling the access to the storage device 6 shared with plural servers, and a management terminal 7 for managing and maintaining the system environment.

In addition, LAN 8 (Local Area Network) connects with two or more servers 1 and the storage control unit 4, and the management terminal 7 manages the whole system.

Herein, the peculiar address called WWN (World Wide Name) is assigned to HBA 2 with which each server 1 is equipped.

Furthermore, the storage controller 4 is a computer equipped with CPU (Central Processing Unit) and memory 20, and it has the management table 30 on which the double allocation prevention program 100, and a zone setting table and a message table are stored in the auxiliary storage unit (not shown in Fig.) serving as a computer-readable recording medium, and at the time of a startup, the double allocation program 100 loaded from the auxiliary storage unit is developed on memory 20, and each processing of the program is performed by CPU 10.

Moreover, plural zones (Zone-1, Zone-2 . . . Zone-n) are setup in the logical storage area of the storage device 6, wherein the real data like a business data is stored as a logical volume. As mentioned above, a logical volume allowed for access from server 1 is stored into any zone partitioned in the logical storage area.

The double allocation prevention program 100 makes storage controller 4 with a set up information receipt means 101 to accept set up information of logical volume in the zone of common storage device 6 from management terminal 7, a double allocation check means 102 to check whether the logical volume overlaps or not, referring to the management table 30 which the set up information is registered, as a result, a temporary allocation means 103 to allocate another logical volume different from the logical volume temporarily when there are overlaps of the same logical volume in each zone of the logical storage area 40, and message output means 104 to send out a message to an operator that the temporary logical volume is allocated to the target zone instead of the set up logical volume due to the double allocation.

Here, for simplification, the embodiment of this present invention is shown by the case that two zones in a logical storage area of a common storage device are set up for two sets of servers, wherein plural logical volumes are allocated.

Moreover, hereinafter, "allocation" of the logical volume to each zone is also expressed as "mapping."

FIG. 2 shows a data structure of a table for setting a zone for a logical volume (in the case of a double allocation) according to this invention. This embodiment shows the case that while Zone#1 mapped for Server-1 (server name) is under operation, Zone#2 (zone number) is mapped for Server-2, and the operator set accidentally in the Zone#2 the same logical volume as in the Zone#1.

The zone setting table as a management table 30 consists of two or more records which consist of the following items; "server name", "zone number" of a logical storage area, "WWN" as a connection port name of a server, and two or more "allocated logical volumes".

For example, the logical volumes of logical volume number LV#0, LV#1, LV#4, and LV#5 are mapped as Zone#1, and Server-1 has become under operation.

Wherein, it is shown that in Zone#2 for Server-2, the logical volumes of LV#2, LV#3, LV#4, and LV#6 are mapped, and. the same logical volume LV#4 which is under application in Zone#1 is mapped accidentally in Zone#2.

FIG. 3 shows a data structure of a table for setting a zone for a logical volume (in the case of a temporary allocation) according to the present invention. The data structure of the table for setting a zone for a logical volume is the same as the data structure in FIG. 2. The double allocation prevention system of this invention creates automatically another logical volume (LV#A) instead of the logical volume (LV#4) of Zone#2 which was erroneously added at mapping.

FIG. 4 shows a data structure of a table for setting a zone for a logical volume (in the case of a flag setting for a temporary allocation) according to the present invention. A zone setting table shows the logical volume assigned to the zone concerned in the zone number of FIG. 2 as a key, and the item of "temporary allocation flag" that means valid or invalids is added. The temporary allocation flag allows the storage controller 4 to judge a permission of access requirements from Server-1.

FIG. 5 shows a flag setting table for sending a message of double allocation to the management terminal) according to this present invention.

The message flag is a flag for responding the message to warn the doubly mapping for each logical volume which is set in the zone of logical storage area 40 of storage device 6, and for the access request from server 1 to be done. In this example, it is shown that the message flag of logical volume LV#A of Zone#2 temporarily allocated is effective.

If the operation of Server-2 is begun, the double allocation prevention system outputs the alert message of the double mapping to Server-2, and warning continues until the operator corrects. Even if warning to Server-2 is disregarded and the operation of Server-2 is continued, data (LV#4) of Server-1 is secured without being destroyed.

Moreover, Server-2 comes for the data of Server-2 to be secured due to be accessed for LV#A. Further, the operator corrects an error according to warning to Server-2. And the logical volume LV # that the mapping is automatically done is adopted as it is, when correcting, or it is also possible for the operator to specify LV # arbitrarily (It is not LV#A, and, for instance, it is assumed LV#7). In this case, warning to the operator is released.

Figure 6:
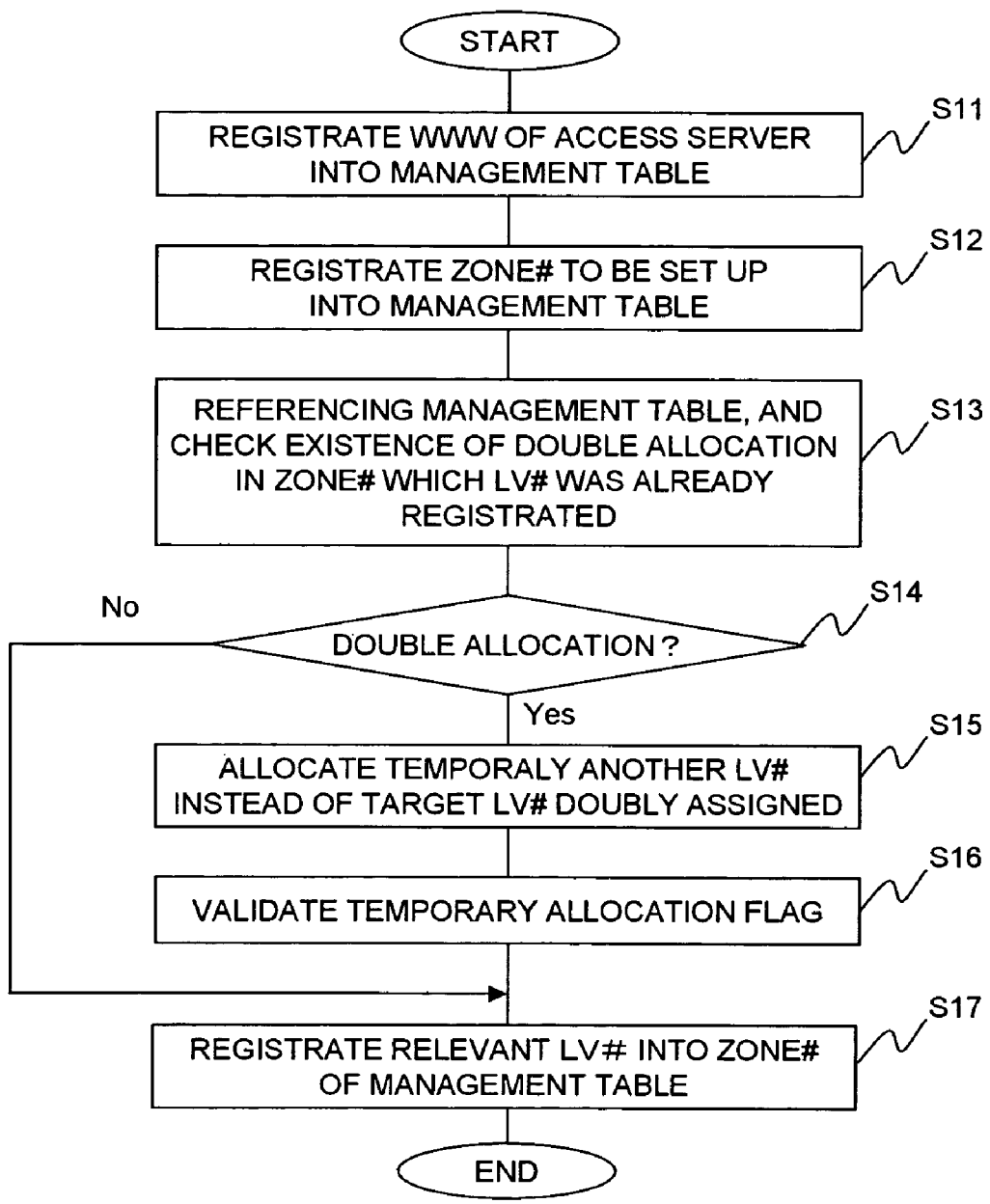
FIG. 6 shows a flow chart for managing a zone data set by an operator.
Figure 7:
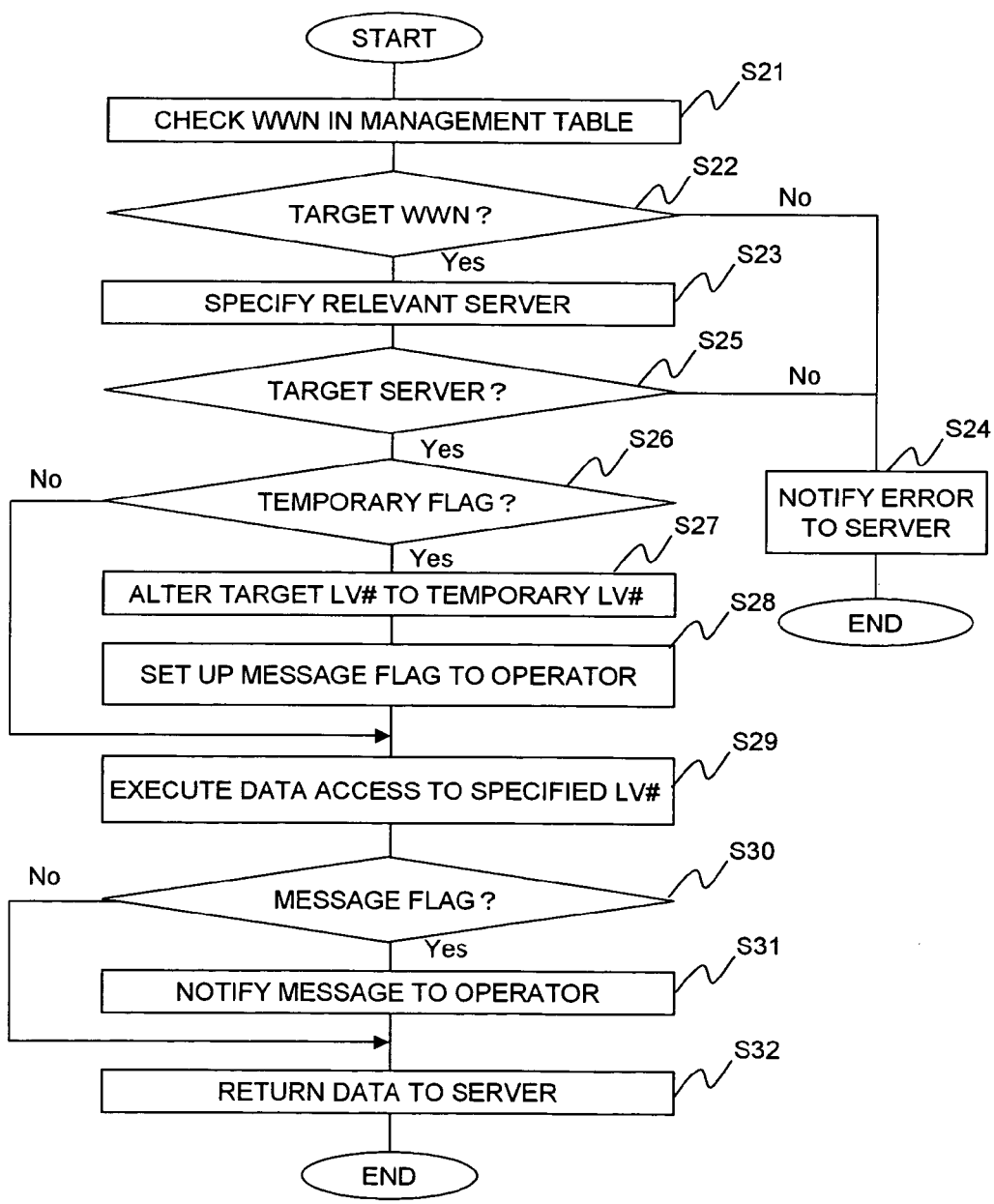
FIG. 7 shows a flowchart for checking logical volumes of a common storage device accessed by two or more servers.
Figure 8:
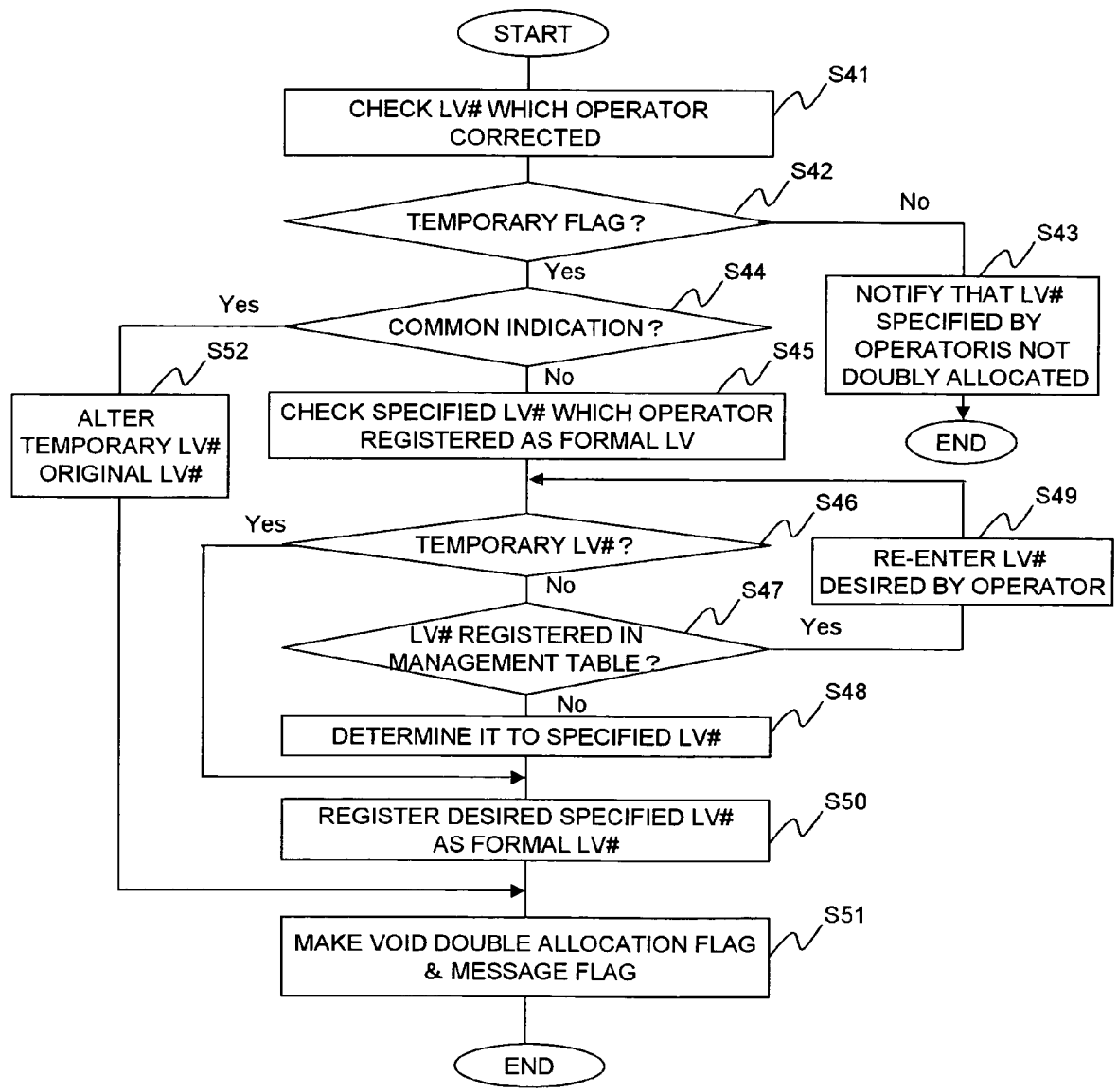
FIG. 8 shows a flow chart for altering a temporal number of another logical volume.

Next, using following FIGS. 6-8, the flow chart for the double allocation prevention system for the logical volume according to this invention is explained.

FIG. 6 shows a flow chart for managing a zone data set by an operator.

First, in step S11, WWN of the server 1 which accesses the storage device 6 is registered into the management table 30 (zone setting table), and in step S12, Zone# (zone number) in the storage region 40 is set up to the management table 30 in the storage device 6.

Next, in step S13, with reference to the managed table 30, it is registered and it is already confirmed in Zone# under operation, the system judges whether a double allocation of the logical volume LV# is existing or not.

In the judgment step of step S14, when there is a double allocation, while assigning automatically a different another temporary logical volume LV# instead of the targeted doubly allocated logical volume LV# in step S15, the temporary allocation flag of the target logical volume in the management table 30 is set up as "valid" in step S16.

Further, in step S17, the LV# concerned is registered into Zone# of the management table 30, and it is ended. Moreover, in step S14, when there is no double assignment, registration processing of step S17 is performed and this flow is ended.

FIG. 7 shows a flow chart for checking logical volumes of a common storage device accessed by two or more servers according to this invention.

First, in step S21, WWN of the management table 30 (zone setting table) is checked, and in the judgment of step S22, if there is not the target WWN, in step S24, an error is notified to a server 1 and it ends.

Moreover, if there is the target WWN in the management table 30, server 1 is specified in step S23. And in step S25, whether there is the target server or not is judged. Next, if the target server is detected, in step S26, it will be judged whether the flag of a temporary logical volume is effective in a logical volume to access or not.

If the flag of the temporary logical volume is valid in step S26, while changing the access position of the logical volume of the target server in the management table 30 into the temporary logical volume L#, in step S28, the message flag to the operator in the management table 30 (message table) is set up as it is effective.

Next, in step S29, a data accessing is performed to the logical volume which the target server required access. Moreover, in step S26, if the logical volume to be accessed is not a temporary logical volume, in step S29, a data accessing will be performed by the logical volume as it is.

Moreover, in step S30, it is judged whether a message flag is effective in the logical volume for the concerned access. If a flag is effective, while answering to the operator of the management terminal 7 by the warning message of double assignment being carried out, in step S31. And in step S32, the real data in the storage device 6 is returned to the server 1. Further, in step S30, if the message flag is null and void, return processing of the real data will be performed in step S32.

FIG. 8 shows a flow chart for altering a temporary number of another logical volume according to this invention.

First, it checks about the logical volume which the operator tried to correct at step S41 according to the warning message received in the management terminal 7.

In step S42, it judges whether a temporary allocation flag is effective or not, and if the temporary allocation flag is not effective, in step S43, the message of the purport which the logical volume LV# specified by an operator is not doubly allocated will be transferred to the management terminal 7.

Moreover, if the temporary allocation flag is effective, it will progress to step S44 and it will be checked whether an operator inputted at the management terminal 7 to share the logical volume of double allocation or not.

As a result, if the sharing of the target logical volume is not inputted, in step S45, it is checked whether the allocation number of the logical volume which an operator wishes was inputted as a formal logical volume in stead of the logical volume concerned or not.

And if the desired assignation number is not in agreement with logical volume LV# (volume number) set up temporarily, progressing to step S47, it is judged whether it is already registered on the managed table 30 or not.

And if desired logical volume LV# (volume number) is registered, in step S49, an another logical volume LV# is specified by the operator, further, step S46-step S47 are repeated until assignation input of another volume number is performed by the operator and an assignation volume number is determined.

On the other hand, in step S47, if desired logical volume LV# (volume number) is not yet registered, it will progress to step S48, logical volume LV# of the request concerned will be determined as an assignation volume number, and temporary logical volume LV# will be registered as formal logical volume LV# in step S50. And in step S51, a double allocation flag and a message flag are repealed, and this flow is ended.

Furthermore, in step S44, if the logical volume which the operator did double assignment serves as a common indication, after changing temporary LV# (volume number) into same LV#, cancellation processing of the double allocation flag & message flag of step S51 will be performed, and this flow will be ended in step S52.

What is claimed is:

1. An allocation apparatus for preventing a logical volume from being doubly allocated in a storage device shared with plural servers, comprising:
   a computer comprising:
      a memory to store a management table which manages a zone with two or more logical volumes prepared for each server by a logical volume number;
      means for receiving set up information of a logical volume corresponding to a logical volume number newly inputted by an operator at a management terminal to set up a zone in a logical storage area of said storage device;
      means for checking whether there exists the same logical volume number as that inputted by the operator, by referring to the management table; and
      means for allocating an unused temporary logical volume corresponding to a temporary logical volume number different from the logical volume number inputted by the operator when it is detected that said inputted logical volume number is doubly allocated in the same logical storage area; wherein the allocation means sets a temporary flag of the temporary logical volume number in the managing table and alters a target logical volume number for the server to access to the unused temporary logical volume based on said temporary flag.

2. The allocation apparatus according to claim 1, wherein said set up information registered in said management table contains a server name, a zone number of said logical storage area in said storage device, and an allocated logical volume number.

3. The allocation apparatus according to claim 2, wherein a message for allocation of said temporary logical volume is notified to an operator at said management terminal when there is a double allocation in the setting of said logical volume.

4. The allocation apparatus according to claim 1, wherein a message for allocation of said temporary logical volume is notified to an operator at said management terminal when there is a double allocation in the setting of said logical volume.

5. The allocation apparatus according to claim 1, wherein when the same logical volume already allocated to a server was allocated to a different server, another logical volume different from said logical volume is temporarily allocated to the different server.

6. An allocation method for preventing a logical volume from being doubly allocated in a storage device shared with plural servers, comprising:
   receiving set up information of a logical volume corresponding to a logical volume number inputted by an operator at a management terminal to set up in a logical storage area of said storage device;
   checking whether there exists the same logical volume number as that inputted by the operator, by referring to a management table which manages a zone with two or more logical volumes prepared for each server and an unused temporary logical storage area designated by a logical volume number; and
   allocating an unused temporary logical volume number as another logical volume number different from the logical volume number inputted by the operator when it is detected that said inputted logical volume number is doubly allocated in the same logical storage area; wherein the allocating further comprises setting a temporary flag of the temporary logical volume number in the managing table and altering a target logical volume number for a server to access to the temporary logical volume number based on said temporary flag.

7. A non-transitory computer-readable recording medium storing an allocating program which, when executed by a computer, prevents a logical volume from being doubly allocated in a storage device shared with plural servers, the program comprising:

receiving set up information of a logical volume corresponding to a logical volume number inputted by an operator at a management terminal to set up in a logical storage area of said storage device;

checking whether there exists the same logical volume number as that inputted by the operator, by referring to a management table which manages a zone with two or more logical volumes prepared for each server and an unused temporary logical storage area designated by a logical volume number; and allocating an unused temporary logical volume number as another logical volume number different from the logical volume number inputted by the operator when it is detected that said inputted logical volume number is doubly allocated in the same logical storage area;

wherein the allocating further comprises setting a temporary flag of the temporary logical volume number in the managing table and altering a target logical volume number for a server to access to the temporary logical volume number based on said temporary flag.

8. A method, comprising:

receiving a requested logical volume number corresponding to a logical volume storage area in a storage area network from a storage area network operator;

determining, by a computer, if the requested logical volume storage area is allocated; and allocating, by the computer, a temporary logical volume number corresponding to an unused temporary logical volume storage area if the requested logical volume storage area is allocated; wherein the allocating includes setting in a managing table, a temporary flag corresponding to the temporary logical volume number and altering the requested logical volume number for the server to access to the temporary logical volume storage area based on the temporary flag.

* * * * *